United States Patent
Tarokh et al.

(10) Patent No.: US 10,602,452 B2
(45) Date of Patent: Mar. 24, 2020

(54) SYSTEM AND METHOD FOR DEVICE-TO-DEVICE OPERATION IN A CELLULAR COMMUNICATIONS SYSTEM

(71) Applicant: Huawei Technologies Co., Ltd., Shenzhen OT (CN)

(72) Inventors: Vahid Tarokh, Cambridge, MA (US); Nimal Gamini Senarath, Ottawa (CA); Peiying Zhu, Kanata (CA); Jianglei Ma, Ottawa (CA); Mohammadhadi Baligh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 14/084,474

(22) Filed: Nov. 19, 2013

(65) Prior Publication Data

US 2014/0141789 A1 May 22, 2014

Related U.S. Application Data

(60) Provisional application No. 61/728,659, filed on Nov. 20, 2012.

(51) Int. Cl.
*H04W 72/00* (2009.01)
*H04W 52/04* (2009.01)
(Continued)

(52) U.S. Cl.
CPC ............ *H04W 52/04* (2013.01); *H04W 4/80* (2018.02); *H04W 52/283* (2013.01);
(Continued)

(58) Field of Classification Search
CPC ......... H04W 52/04; H04W 4/80; H04W 4/02; H04W 52/283; H04W 52/383; H04W 72/02

See application file for complete search history.

(56) References Cited

U.S. PATENT DOCUMENTS 8,611,924 B2 * 12/2013 Shu ............................ 455/456.1
8,929,831 B2 *  1/2015 Kasslin et al. ............. 455/67.11
(Continued)

FOREIGN PATENT DOCUMENTS

CN          102123496 A      7/2011
CN          102388666 A      3/2012
(Continued)

OTHER PUBLICATIONS

Machine translation of CN101064922 abstract.*
(Continued)

*Primary Examiner* — Amancio Gonzalez
(74) *Attorney, Agent, or Firm* — Slater Matsil, LLP

(57) ABSTRACT

A method for operating a first device-to-device (D2D) device in a cellular communications system includes receiving geo-location information from a first entity in the cellular communications system, the geo-location information including location information for cellular users of the cellular communications system and resources of the cellular communications system available to the cellular users, selecting one of the resources to avoid causing interference to a cellular transmission, the resource being selected in accordance with the geo-location information, and transmitting to a second D2D device over the selected resource.

29 Claims, 9 Drawing Sheets

(51) Int. Cl.
*H04W 72/02* (2009.01)
*H04W 52/38* (2009.01)
*H04W 52/28* (2009.01)
*H04W 4/80* (2018.01)
*H04W 72/04* (2009.01)

(52) U.S. Cl.
CPC ......... *H04W 52/383* (2013.01); *H04W 72/02* (2013.01); *H04W 72/048* (2013.01)

(56) References Cited

U.S. PATENT DOCUMENTS

| | | | |
|---|---|---|---|
| 2009/0296641 A1* | 12/2009 | Bienas et al. | 370/329 |
| 2009/0325625 A1* | 12/2009 | Hugl | H04W 52/16 455/522 |
| 2010/0255794 A1* | 10/2010 | Agnew | H04W 16/14 455/77 |
| 2010/0323715 A1* | 12/2010 | Winters | 455/456.1 |
| 2011/0134779 A1 | 6/2011 | Kim et al. | |
| 2012/0044815 A1* | 2/2012 | Geirhofer | H04W 8/005 370/248 |
| 2012/0051315 A1 | 3/2012 | Wang et al. | |
| 2012/0129522 A1* | 5/2012 | Kim et al. | 455/434 |
| 2012/0243431 A1 | 9/2012 | Chen et al. | |
| 2013/0252621 A1* | 9/2013 | Dimou | H04W 72/082 455/450 |

FOREIGN PATENT DOCUMENTS

| | | |
|---|---|---|
| CN | 102638893 A | 8/2012 |
| WO | 2011050519 A1 | 5/2011 |
| WO | 2011088619 A1 | 7/2011 |

OTHER PUBLICATIONS

Machine translation of CN101064922 specification.*
Figures from CN101064922.*
International Search Report and Written Opinion of Patent Cooperation Treaty (POT), International Application No. PCT/CN2013/087487, Applicant: Huawei Technlogies, Co., Ltd., dated Feb. 27, 2014, 11 pages.
Xu, H. et al., "Efficient Resource Allocation with Flexible Channel Cooperation in OFDMA Cognitive Radio Networks," INFOCOM, 2010 Proceedings IEEE, Mar. 14-19, 2010, 9 pages.
Extended European Search Report received in Application No. 13856688.0-1857 dated Sep. 2, 2015, 7 pages.

* cited by examiner

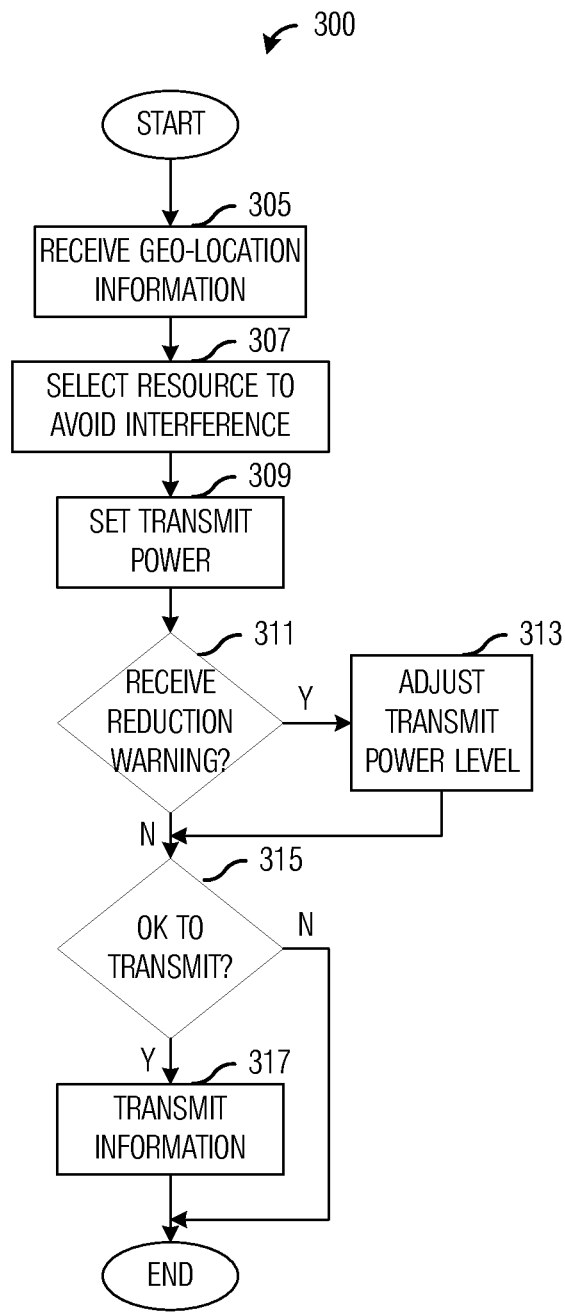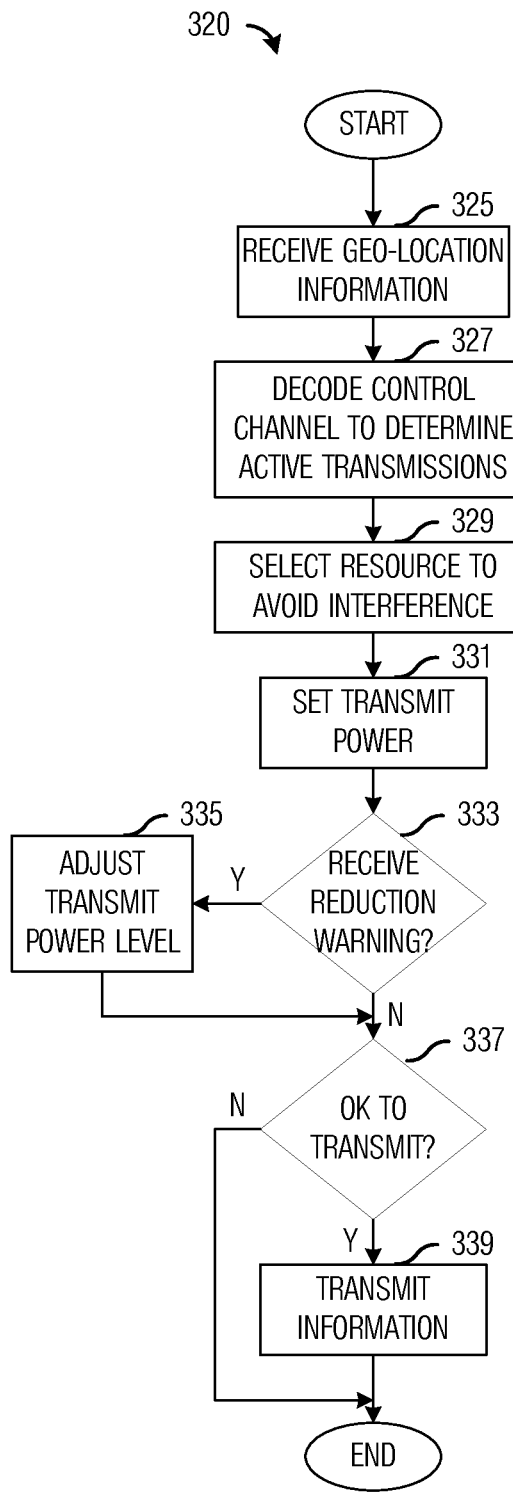
*Fig. 3a*
*Fig. 3b*

SYSTEM AND METHOD FOR DEVICE-TO-DEVICE OPERATION IN A CELLULAR COMMUNICATIONS SYSTEM

This application claims the benefit of U.S. Provisional Application No. 61/728,659, filed on Nov. 20, 2012, entitled "System and Method for Device-to-Device Transmission in a Cellular Network," which application is hereby incorporated herein by reference.

TECHNICAL FIELD

The present disclosure relates generally to digital communications, and more particularly to a system and method for device-to-device (D2D) operation in a cellular communications system.

BACKGROUND

More and more machines are connected to the Internet and machine-to-machine (M2M) communication requirements are expected to grow rapidly. M2M communications may also be referred to as D2D communications. The number of machines connected to the Internet in the near future is projected to be in the billions. Many of these communication requirements are covered if D2D communications (of devices close to each other) is facilitated. Existing proposals for D2D include using a different frequency band (e.g., 12 Ghz), using power line carrier communications, using WiFi-like systems (sense and use the same protocol), using cellular frequencies as secondary users with cognitive capability, and D2D facilitated by the approval of cellular network using an uplink depending on the situation and availability (e.g., Direct User Equipment (UE)).

With respect to the sharing of spectrum, currently a number of devices are sharing the industrial, scientific and medical (ISM) band. In some cases such as WiFi, listen before talk courtesy is being practiced (e.g., variants of carrier sense multiple access (CSMA) protocol). However, most machine to machine communications traffic typically is short packets, and in some cases may require some quality of service (QoS).

With respect to cognitive systems as secondary users, a spectrum owned by a primary user (e.g., a TV broadcaster) may be used by secondary users subject to some rules. Typically, the secondary user is required to sense the channel, and, if the signal of a primary user is present, refrain from transmission. Additional protection for the primary network also can be provided by: banning secondary transmissions in some bands in certain geographical regions, requiring access to a database to check for active primary transmitters in a region, refraining from transmission in their band, imposing strict limitations on transmission power of secondary devices, requiring the checking for beacons transmitted by the primary transmitter devices to determine if they are active, and the like.

SUMMARY OF THE DISCLOSURE

Example embodiments of the present disclosure which provide a system and method for device-to-device (D2D) operation in a cellular communications system.

In accordance with an example embodiment of the present disclosure, a method for operating a first device-to-device (D2D) device in a cellular communications system is provided. The method includes receiving, by the first D2D device, geo-location information from a first entity in the cellular communications system, the geo-location information including location information for cellular users of the cellular communications system and resources of the cellular communications system available to the cellular users, and selecting, by the first D2D device, one of the resources to avoid causing interference to a cellular transmission, the resource being selected in accordance with the geo-location information. The method also includes transmitting, by the first D2D device, to a second D2D device over the selected resource.

In accordance with another example embodiment of the present disclosure, a method for operating a communications controller of a cellular communications system is provided. The method includes determining, by the communications controller, geo-location information for the cellular communications system, the geo-location information including location information for cellular users of the cellular communications system and resources of the cellular communications system available to the cellular users, and transmitting, by the communications controller, the geo-location information to device-to-device (D2D) devices operating within a coverage area of the cellular communications system. The method also includes communicating, by the communications controller, with a cellular user operating within a coverage area of the communications controller in accordance with a resource allocation for the cellular user.

In accordance with another example embodiment of the present disclosure, a device-to-device (D2D) device is provided. The D2D device includes a receiver, a processor operatively coupled to the receiver, and a transmitter operatively coupled to the processor. The receiver receives geo-location information from a first entity in a cellular communications system, the geo-location information including location information for cellular users of the cellular communications system and resources of the cellular communications system available to the cellular users. The processor selects one of the resources to avoid causing interference to a cellular transmission, the resource being selected in accordance with the geo-location information. The transmitter transmits to a second D2D device over the selected resource.

One advantage of an embodiment is that resources of a cellular communications system are reused for D2D transmissions, even if the resources are in full use by the cellular communications system.

A further advantage of an embodiment is that limited signaling overhead is required to implement the example embodiments, hence the impact of the example embodiments is minimized.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 3a illustrates a flow diagram of first example operations occurring in a first D2D device as the first D2D device communicates with a second D2D device using geo-location information provided by a cellular communications system according to example embodiments described herein;

FIG. 3b illustrates a flow diagram of second example operations occurring in a first D2D device as the first D2D device communicates with a second D2D device using geo-location information and control channel information provided by a cellular communications system according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to device-to-device (D2D) operation in a cellular communications system. For example, a D2D device receives geo-location information from a first entity in the cellular communications system, the geo-location information including location information for cellular users of the cellular communications system and resources of the cellular communications system available to the cellular users, selects one of the resources to avoid causing interference to a cellular transmission, the resource being selected in accordance with the geo-location information, and transmits to a second D2D device over the selected resource.

The present disclosure will be described with respect to example embodiments in a specific context, namely D2D devices operating within a coverage area of a cellular communications system or a cellular like communications system. The disclosure may be applied to standards compliant communications systems, such as those that are compliant with Third Generation Partnership Project (3GPP) Long Term Evolution (LTE), and the like, technical standards, and non-standards compliant communications systems, that use cellular communications techniques to support communications.

Figure 1:
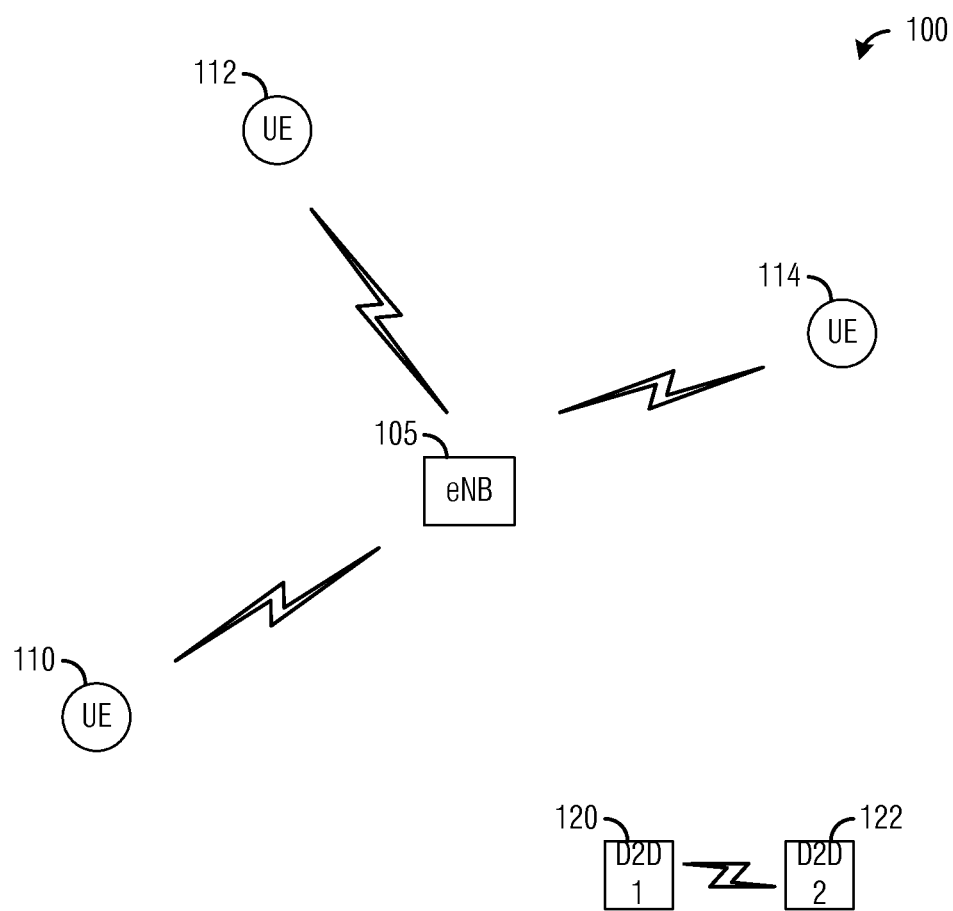
FIG. 1 illustrates an example cellular communications system according to example embodiments described herein.

FIG. 1 illustrates an example cellular communications system 100. Cellular communications system 100 includes an evolved NodeB (eNB) 105 serving a plurality of user equipment (UE), such as UE 110, UE 112, and UE 114. eNB 105 may control communications of its UEs by granting resource allocations (also commonly referred to as transmission opportunities) to its UEs. A UE served by an eNB can receive a transmission (over a downlink) or make a transmission (over an uplink) when it has been granted a resource allocation. The use of resource allocations to control communications is a technique used in cellular communications systems. A resource in a cellular communications system may be a time resource, a frequency resource, or a combination time-frequency resource. As an example, a cellular communications system may have a frame comprising 10 frequency bands and frame may be divided into 10 time slots. Therefore, there are a total of 100 time-frequency resources per frame, and individual time-frequency resource may be addressed by their frequency band and time indices.

An eNB may also be commonly referred to as a NodeB, a base station, an access point, a controller, a communications controller, and the like, while a UE may also be commonly referred to as a mobile station, a mobile, a terminal, a user, a subscriber, and the like.

While it is understood that communications systems may employ multiple eNBs capable of communicating with a number of UEs, only one eNB, a number of UEs, and two D2D devices are illustrated for simplicity.

Also shown in FIG. 1 are two D2D devices, D2D device 120 and D2D device 122. D2D devices may communicate directly with one another without having to be given a resource allocation or having to communicate through an intermediary, such as an eNB. D2D devices may be short to medium-short range devices capable of communicating with each other up to a few feet or tens of feet, while cellular devices may be medium to long range devices that are capable of communicating with their respective eNBs located up to a mile or more away. As shown in FIG. 1, the two D2D devices may be operating within a coverage area of cellular communications system 100. When operating in D2D mode, the two D2D devices may not have much interaction with eNB 105 or the plurality of UEs. However, in some example embodiments, D2D devices may also be UEs that are capable of communicating using cellular communications system 100.

According to an example embodiment, resources of a cellular communications system is reused for other transmissions (such as for D2D transmissions) even if the resources are fully in use by the cellular communications system. In some deployments, the entirety of the resources of a cellular communications is fully loaded during peak hours. The increasing deployment of smart telephones and wide spread use of high speed wireless Internet access, both voice and data traffic will grow significantly. Therefore, the usage of the resources of the cellular communications system is expected to only become worse. In fact, there may be no unoccupied resources of a cellular communications system deployed in many densely populated regions during peak periods.

Cellular devices may have geo-location capabilities (an ability to determine their location either through measurements, telemetry, or a combination thereof) or are able to obtain geo-location information from the cellular communications system. This may be due in part to governmental regulations, such as emergency service providers (E-911). According to an example embodiment, D2D devices may also be aware of approximate location. The D2D devices may be able to achieve such knowledge through geo-location capabilities, obtaining their location from other devices that have geo-location capability, obtaining their location from the cellular communications system, and the like. Other techniques may also be used for obtaining geo-location information, such as obtaining the geo-location information from neighboring networks (e.g., WiFi locationing), from user input for stationary devices (such as appliances, for example).

In cellular communications systems, the use of resources is finely controlled to help reduce interference. As an example, if two eNBs are neighbors and each is transmitting to (or receiving from) its own UE, the two eNBs may use different resources to transmit to (or receive from) their respective UEs in order to reduce interference. The control of resources may be based on geo-location information.

According to an example embodiment, geo-location information of UEs may be provided to D2D devices by the cellular communications system. Operators of the cellular communications system may use systems that provide media access control (MAC) layer information to UEs over a control sub-channel (either physical or logical sub-channel). The MAC layer information informs the UEs of resources assigned to them, i.e., resource allocations. In addition to resource allocations, the locations of eNBs and UEs may also be provided by the cellular communications system. Such location information may be signaled over control channels, or stored in a database accessible by the D2D devices.

According to an example embodiment, geo-location information may be utilized to enable the re-use of resources of the cellular communications system. According to another example embodiment, the cellular communications system may provide D2D services on the same resources. Geo-location information and resource usage awareness in the cellular communications system may be used to allow for the use of resources of the cellular communications system by D2D devices. Almost all eNBs serve multiple UEs, achieved by using different resources (also commonly referred to as resource blocks (RBs)). At a given location, for downlink and/or uplink, not all of the resources are fully utilized by the cellular communications system since some of the resources may be assigned to UE not present at the location. A control channel and/or broadcast channel may be decoded to obtain information regarding the utilization of the resources. The geo-location information and the resource usage awareness, in combination with low transmission power levels and advanced coding techniques, may enable the support of D2D communications without causing undue interference to the cellular communications system.

When the D2D device uses downlink resources, a D2D transmission interferes with a UE receiving in the same resource only if the UE is sufficiently close to the D2D device to suffer harmful interference. Since the D2D transmission may be set at a very low transmit power level when compared to transmissions of eNBs and because D2D antennas are usually not elevated (as are those of eNBs), the interference from the D2D transmission to the UE is much smaller than interference from neighboring eNBs of the UE using the same resource, if the distance to the UE is kept sufficiently large. Hence, downlink resources may be a good choice for use in D2D transmissions.

When the D2D device uses uplink resources, the D2D transmission interferes with an eNB for any UE in any sector of the eNB using the same resource. The D2D transmission may also cause interference to neighboring eNBs. The D2D transmission may cause harmful interference when the transmit power level is strong enough at the eNB to negatively impact reception of transmissions from the UEs. Therefore, the D2D devices may have to control and limit their transmit power levels depending on their location, underlying resources, UE transmission power levels, desired rate of transmission of the UEs using the same resource, and the like. In addition, uplink transmissions from the UEs may generate interference at a D2D device, which may be avoided if the D2D device is sufficiently far away from the UEs that are using the same resources.

Figure 2A:
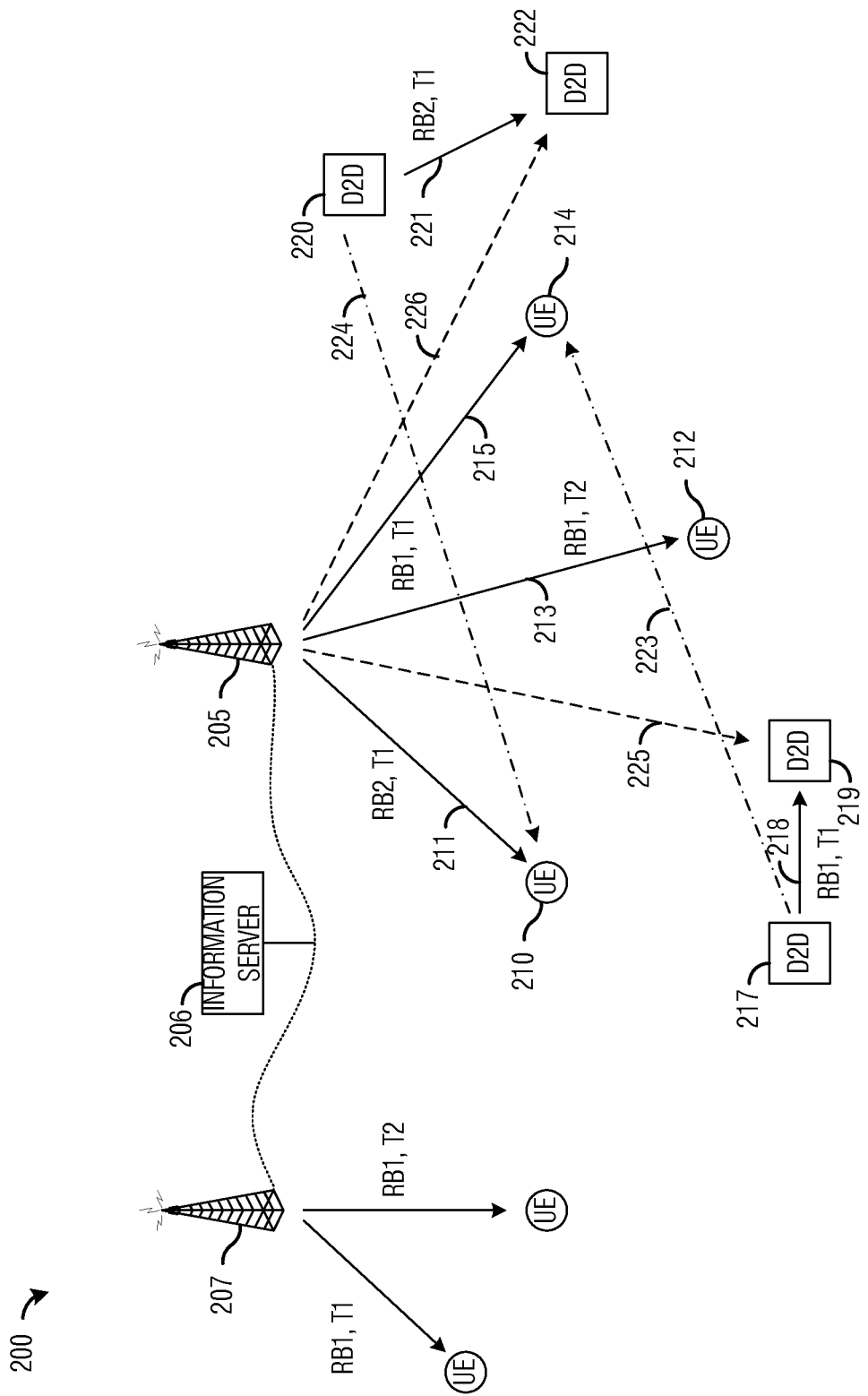
FIG. 2a illustrates an example cellular communications system with a plurality of D2D devices operating using downlink resources according to example embodiments described herein.

FIG. 2a illustrates an example cellular communications system 200 with a plurality of D2D devices operating using downlink resources. Cellular communications system 200 includes eNB 205 and eNB 207. eNB 205 is transmitting to a plurality of UEs, including UE 210, UE 212, and UE 214, over downlinks 211, 213, and 215, respectively. Downlink 211 occurs on a resource identified as Resource Block 2 and Time 1 (RB2, T1), downlink 213 occurs on a resource identified as RB1, T2, and downlink 215 occurs on a resource identified as RB1, T1. Cellular communications system 200 also includes an information server 206 (or some other dedicated D2D support device) that maintains and provides geo-location information. Information server 206 may provide the geo-location information to D2D devices.

D2D device 217 makes a transmission to D2D device 219. Since D2D device 217 and D2D device 219 are located far away from UE 214, D2D device 217 uses the same resource as downlink 215 (RB1, T1) to transmit to D2D device 219, shown in FIG. 2a as link 218. Similarly, D2D device 220 transmits to D2D device 222 using the same resource as downlink 211 (RB2, T1), shown as link 221.

Although D2D device 217 and D2D device 219 are far away from UE 214, it is possible that transmission over link 218 may cause interference at UE 214 (shown as interference 223). Similarly, transmission over link 221 may cause interference at UE 210 (shown as interference 224). Also, transmission from eNB 205 to UE 214 may cause interference at D2D device 219 (shown as interference 225) and transmission from eNB 205 to UE 210 may cause interference at D2D device 222 (shown as interference 226).

There are several ways to determine the resources that are being used by an eNB, such as eNB 205. Resource assignments may be made dynamically, semi-statically, or statically. In a dynamic resource assignment, the resource assignment may be changed rapidly and may be made for each TTI. The D2D devices have to listen to a broadcast or control channel and use the resources in the same channel. In a semi-static resource assignment, after assignment the resource assignment may be fixed for some time, e.g., persistent scheduling. In such a scenario, specific messaging may be used in broadcast channels to inform devices (e.g., UEs, D2D devices, and the like) about active resource assignments. Active resource assignments may comprise current and/or future resource assignments. In a static resource assignment, the resource assignment may be either fixed or changed only over a long period of time. In this scenario, the resource assignments may be announced in the Internet, a network, or a database on a regional basis. According to an example embodiment, the resources may be divided into groups and assigned to different geographical areas. D2D devices may use resources assigned to geographical areas distant to them. The division of resources into groups that are assigned to different geographical areas may be performed in a static manner, where changes usually occur slowly over extended amounts of time.

According to an example embodiment, when downlink resources are used, D2D devices may access a geo-location information database to obtain location information of active UEs, and determine resources to be used as well as transmit power levels. Alternatively, the geo-location information may be broadcast by the cellular communications system so that D2D devices within hearing range can receive the geo-location information or encrypted that only pre-approved D2D devices or groups of D2D devices can receive the geo-location information.

Figure 2B:
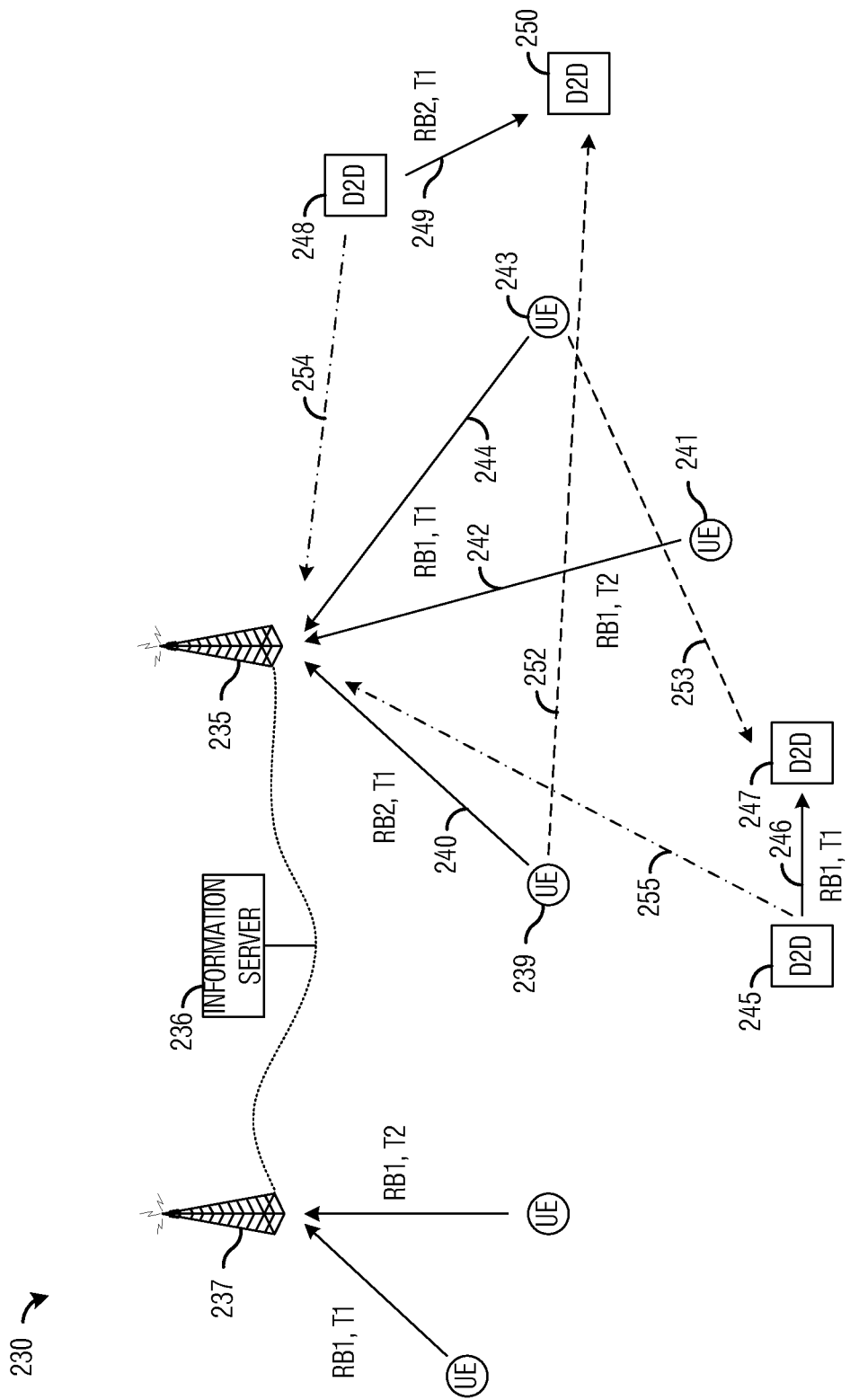
FIG. 2b illustrates an example cellular communications system 230 with a plurality of D2D devices operating using uplink resources according to example embodiments described herein.

FIG. 2b illustrates an example cellular communications system 230 with a plurality of D2D devices operating using uplink resources. Cellular communications system 230 includes eNB 235 and eNB 237. eNB 235 is receiving from a plurality of UEs, including UE 239, UE 241, and UE 243, over uplinks 240, 242, and 244, respectively. Downlink 240 occurs on a resource identified as RB2, T1, downlink 242 occurs on a resource identified as RB1, T2, and downlink 244 occurs on a resource identified as RB1, T1. Cellular communications system 200 also includes an information server 236 (or some other dedicated D2D support device) that maintains and provides geo-location information. Information server 236 may provide the geo-location information to D2D devices.

D2D device 245 makes a transmission to D2D device 247. Since D2D device 245 and D2D device 247 are located far away from UE 243, D2D device 245 uses the same resource as uplink 244 (RB1, T1) to transmit to D2D device 246, shown in FIG. 2b as link 246. Similarly, D2D device 248 transmits to D2D device 250 using the same resource as uplink 240 (RB2, T1), shown as link 249.

Although D2D device 245 and D2D device 247 are far away from eNB 235, it is possible that transmission over link 246 may cause interference at eNB 235 (shown as interference 255). Similarly, transmission over link 249 may cause interference at eNB 235 (shown as interference 254). Also, transmission from UE 239 to eNB 235 may cause interference at D2D device 250 (shown as interference 252) and transmission from UE 243 to eNB 235 may cause interference at D2D device 247 (shown as interference 253).

According to an example embodiment, interference caused by D2D device transmissions to far away cellular devices may be mitigated by reducing the transmit power level of the D2D devices. Similarly, interference from cellular devices to D2D devices or that arises from simultaneous D2D transmissions may be mitigated by using advanced signal coding techniques, such as the use of long codes for the D2D transmissions, and the like.

According to an example embodiment, a cellular communications system may be configured to avoid the use of subsets of resources in defined geographical areas. As an illustrative example, in a first geographical area of the cellular communications system, a first subset of resources is not used, in a second geographical area of the cellular communications system, a second subset of resources is not used, in a third geographical area of the cellular communications system, a third subset of resources is not used, and the like. D2D devices operating in a respective geographical area may use the subset of resources not used in the geographical area to communicate. According to an alternative example embodiment, instead of specifying a subset of resources to avoid in a geographical area, a subset of resources may be specified for use in a geographical area.

D2D devices operating in the geographical area may use resources other than the resources in the subset of resources to communicate.

In such a situation, D2D devices may only need to know which geographical areas use which specific resources. The information may be static (or semi-static) in nature since the allocation of resources to geographical areas does not change continuously. The coverage area of the cellular communications system may be divided into geographical areas with or without overlap. The resources not used (or used) in a geographical area may be configured by an operator of the cellular communications system. The configuration of the resources not used (or used) may change over time to avoid the loss of frequency selective scheduling (FSS) gain. The D2D devices may make use of the unused resources with D2D transmissions set at specified transmit power levels. This technique may be used with uplink and/or downlink resources.

As discussed previously, an operator of a communications system may configure resources in a number of ways, including a) specifying resources used in a given geographic area, and b) specifying resources not used in a given geographic area.

In a situation when the operator specifies resources used in a given geographic area, D2D devices typically cannot guarantee that there is no interference to UEs even if the D2D devices do not use those specific resources because the D2D devices that are located at the boundary of the geographic area may cause excessive interference to UEs operating in the neighboring geographic areas. The D2D devices may need to have additional information such as the resources being used in the neighboring geographic areas. As an example, the D2D devices may use only the resources used in faraway geographic regions. Furthermore, limiting resources to specific geographic areas lower the network efficiency as the flexibility of assignment is reduced. Although the communications system may reuse the resources that are used in geographic areas that are separated by a sufficient distance, it might not be an attractive solution due to reasons such as those discussed previously. Therefore, the geographic areas indicating the resources that are not used may be a better option due to higher resource utilization.

Figure 2C:
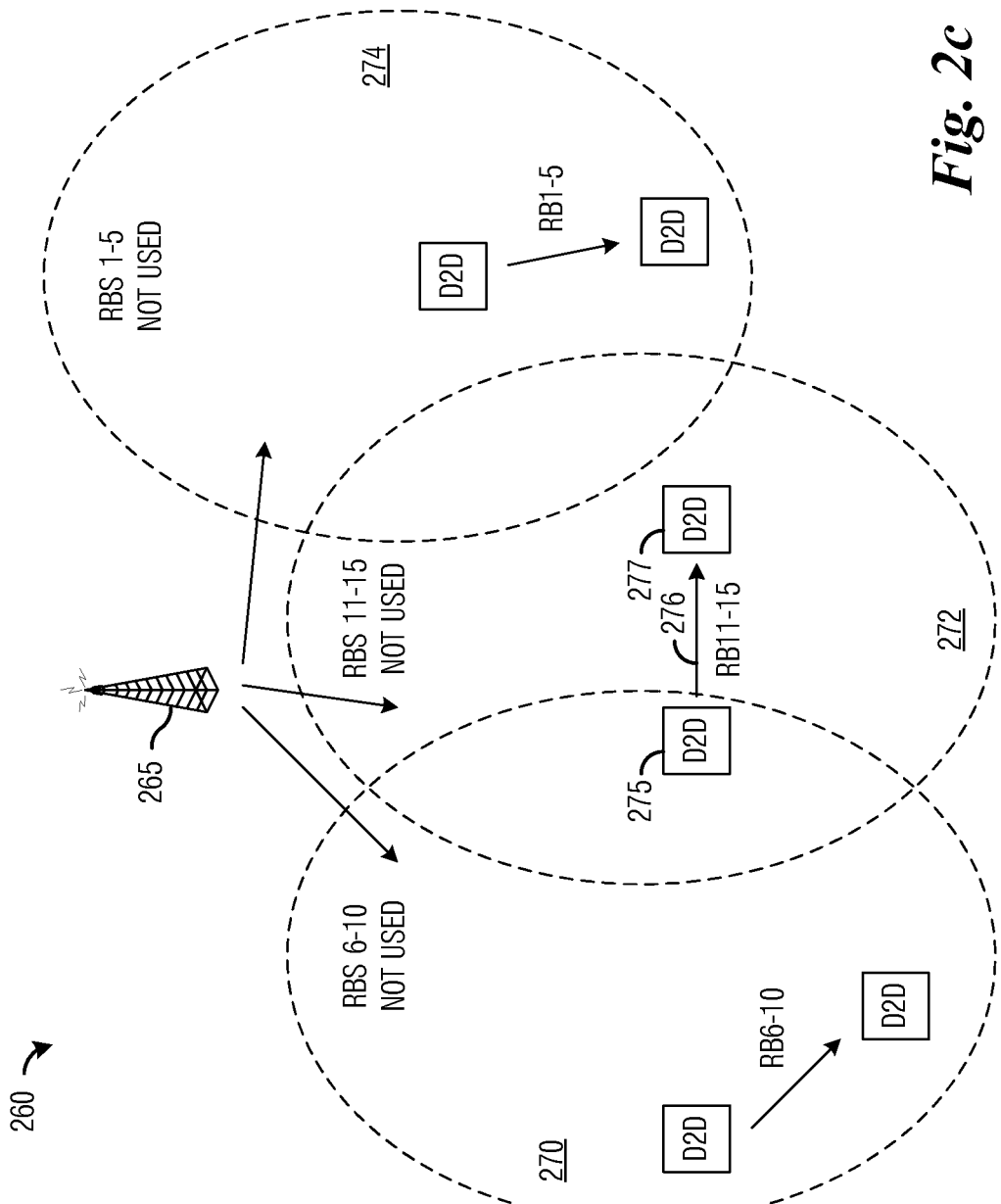
FIG. 2c illustrates an example cellular communications system with a plurality of D2D devices using subsets of resources not used in cellular communications system to communicate according to example embodiments described herein.

FIG. 2c illustrates an example cellular communications system 260 with a plurality of D2D devices using subsets of resources not used in cellular communications system 260 to communicate. As shown in FIG. 2c, cellular communications system 260 includes an eNB 265 and three geographical areas, area 270, area 272, and area 274. Cellular devices in area 270 may not use resources identified as RBs 6-10 for communications, cellular devices in area 272 may not use resources identified as RBs 11-15 for communications, and cellular devices in area 274 may not use resources identified as RBs 1-5 for communications. D2D device 275 and D2D device 277 operating in area 272 may communicate using RBs 11-15 since cellular devices in area 272 do not use those resources in communications. Cellular communications system 260 may also include an information server to maintain and provide geo-location information. It is noted that geographical areas do not need to be defined solely on location or distance. As an example, geographical areas may be defined on received signal powers of eNBs, path loss of communications channels between UEs and eNBs, and the like.

According to an example embodiment, a cellular communications system may be configured to use different transmit power levels for different regions of the cellular communications system, for example, depending on distance away from an eNB. When a relatively low transmit power level is being used (such as for eNB transmissions to UEs located close to the eNB or cell center UEs (CCU)), the communications are more susceptible to interference than when a high transmit power level is being used (such as for eNB transmissions to UE located far from the eNB or cell edge UEs (CEU)). Therefore, D2D communications may be prohibited when low transmit power levels are being used (i.e., when the D2D devices are close to eNBs) and enabled when high transmit power levels are being used (i.e., when the D2D devices are far from the eNBs).

According to an example embodiment, the eNBs of a cellular communications system, such as cellular communications system 260, may each have multiple geographical areas and each geographical area may have a subset of resources not used in the geographical area. Coordination between the various eNBs may aid in the preparation of the geographical areas and the subsets of resources for each geographical area. Alternatively, each geographical area may have a subset of resources used in the geographical area. Furthermore, a cellular communications system may include some eNBs that utilize geographical areas with attendant subset of resources and some eNBs that do not utilize geographical areas. Information about the geographical areas and the subsets may be provided to the D2D devices by a single eNB (e.g., its serving eNB) or by each individual eNB.

Figure 2D:
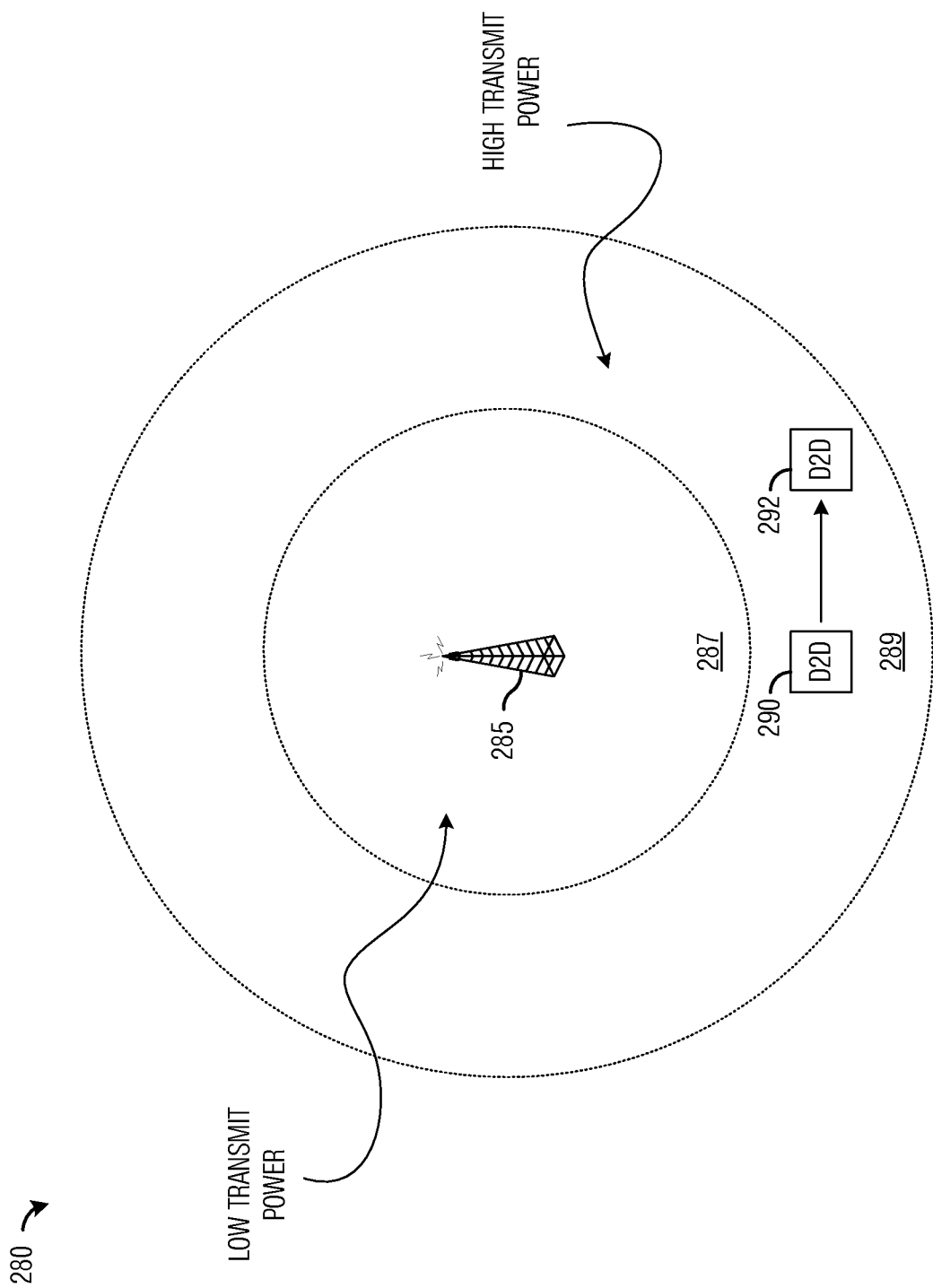
FIG. 2d illustrates an example cellular communications system illustrating regions of different transmit power levels according to example embodiments described herein.

FIG. 2d illustrates an example cellular communications system 280 illustrating regions of different transmit power levels. Cellular communications system 280 includes an eNB 285. As shown in FIG. 2d, eNB 285 may use two different transmit power levels: a first transmit power level that is relatively low for UEs operating in close proximity to eNB 285 (shown as region 287), and a second transmit power level that is higher for UEs operating further away from eNB 285 (shown are region 289). D2D devices 290 and 292, operating in region 289 may transmit to one another. Cellular communications system 280 may also include an information server to maintain and provide geo-location information.

According to an example embodiment, a D2D device may check to determine if it is operating in a high interference area (or a low interference area) when it is using uplink resources for communications or a high transmit power level area (or a low transmit power level area) when it is using downlink resources for communications. The cellular communications system, such as cellular communications system 280, may transmit an indication of the interference level or the transmit power level. It is noted that multiple interference levels or transmit power levels may be transmitted by multiple eNBs. As an example, when uplink resources are used by the D2D device, for some resources only low interference to neighboring cells may be allowed by the cellular communications system so that for those resources, the neighboring cells can use those same resources for their own cell edge UEs. Hence, D2D devices may also make use of these resources to transmit along with the UEs since interference limit is generally high. When the allowed interference to a resource is small, the D2D devices may not be able to use those resources or need to use them with a lower transmit power. Information about the interference levels and transmit power levels may be provided to the D2D devices by a single eNB (e.g., its serving eNB) or by each individual eNB.

When downlink cellular resources are used by the D2D devices, similar techniques, such as fractional frequency reuse (FFR), exist where for some frequency bands a low transmit power level is used and for some other frequency bands a high power level is used. Transmission in a high power frequency band may not be suitable for D2D communications close to the eNB due to high interference, therefore, the high power frequency band may be better suited for the cell-edge users. But transmissions may be limited to the resources used in the specific region to avoid the interference to the UEs. For a low power frequency band, even relatively close D2D communications may be allowed since regional separation is present to isolate UEs from D2D interference.

FIG. 3a illustrates a flow diagram of first example operations 300 occurring in a first D2D device as the first D2D device communicates with a second D2D device using geo-location information provided by a cellular communications system. Operations 300 may be indicative of operations occurring in a first D2D device, such as D2D devices 217, 220, 245, 248, 275, and 290, as it communicates with a second D2D device using geo-location information provided by a cellular communications system.

Operations 300 may begin with the first D2D device receiving geo-location information from the cellular communications system (block 305). The first D2D device may receive the geo-location information from one or more eNBs, e.g., eNBs that are located near the first D2D device. The geo-location information may include location information of cellular users (i.e., UEs) in the communications system to whom an eNB is currently, intends to transmit to at a given time, intends to give a resource allocation to at a given time, and the like. The geo-location may also include information about resources allocated to UEs. The first D2D device may receive the geo-location information in a broadcast message or a multicast message from the cellular communications system. The geo-location information may be stored in a database that can be dynamically updated as needed to meet changing environmental conditions, such as changes due to UE mobility, newly added eNBs, failed eNBs, and the like.

According to an example embodiment, the geo-location information may include information about a division (or partitioning) of resources in accordance with geographical area with a geographical area including a subset of resources that are not used within the geographical area. The first D2D device may then use the subset of resources when it is in the geographical area. The geo-location information related to the division of resources may be relatively static and may change at specified times or upon occurrence of events.

From information derived from the cellular communications system, as well as its own capabilities, the first D2D device may be able to determine its own location to about 200-300 meters, which is adequate for most purposes. Along with geo-location information and information about upcoming UE and resource assignments from the cellular communications system, the first D2D device can determine resources of UEs that are close to the first D2D device (a list of resources to avoid). The first D2D device may avoid the use of these resources in upcoming D2D transmissions, thereby producing a list of potential resources for upcoming D2D transmissions.

According to an example embodiment, path loss values from multiple UEs may be used (instead of or in conjunction with geographical location information) to perform a partitioning of geographical areas. It is noted that in this example embodiment, the geographical areas may be virtual since actual geographical information may not be used to partition the geographical areas. In such a scenario, UE to eNB path loss values may be used to categorize UEs into different geographical areas. Then, a method of assigning D2D devices to a specific geographical area may be to use a categorization technique similar to that uses for the UEs where path loss values to eNBs are used. Another technique may involve the use of geo-location information of D2D devices, where eNBs may already have a mapping function used to map potential D2D geo-location information to the geographical areas. As an example, historical interference information for the D2D devices may be used.

The first D2D device may select a resource of the cellular communications system available for use in accordance with the geo-location information (block 307). As an example, the first D2D device may select a resource of the cellular communications system that is not being used within a certain distance of the first D2D device (and of the second D2D device). The certain distance may be specified by an operator of the cellular communications system, or it may be set in accordance with a performance metric. The performance metric may be an interference measured at an eNB or a UE, an error rate of an eNB or a UE, and the like.

As an illustrative example, the first D2D device may determine a list of permissible resources from the list of resources to avoid and information about available resources utilizing its own intended transmit power level. For example, the first D2D device may select available resources not in the list of resources to avoid and are assigned to UE that are far away from the first D2D device, where the transmit power level of the first D2D device has an impact on an actual value of far away. The resources selected by the first D2D device may be declared as admissible resources.

As another illustrative example, for downlink resources, the first D2D device may estimate for each nearby UE U, an aggregate interference $I_U$ from close-by interfering eNB(s) to U. A path loss model may be assumed and the maximum transmit power level of eNBs may be used. As an alternative illustrative example, the cellular communications system may provide actual transmit power levels of eNBs in the geo-location information or in separate broadcasts. The first D2D device may determine its own interference $I_U(D2D)$ to U and select a resource RB as admissible for U only if $I_U/I_U(D2D)$ is above a specified threshold $T_D$. The first D2D device may declare the resource RB as admissible if the resource RB is admissible for all nearly UE having been assigned the resource RB. Furthermore, the first D2D device may determine a score S for each admissible resource. As an example, the score S may be configured so that the admissible resources suffering less interference from the D2D transmissions of the first D2D device have higher score S.

Then, for each UE U assigned to an admissible resource RB, the aggregate interference $I_U$ from the closest interfering eNB(s) to U, and the interference $I_U(D2D)$ from the first D2D device to U are determined. The score S for the resource RB can be set to a minimum of $I_U/I_U(D2D)$, where the minimum is for all UE U assigned to resource RB. Other possible score functions may be used.

The selection of the resource may be performed based on the score S of the admissible resources, for example. The first D2D device may transmit using the resource RB with the highest score S, thereby ensuring that the first D2D device generates the least amount of harmful interference to the cellular communications system, specifically, the downlink of the cellular communications system. However, D2D transmissions of the first D2D device on other admissible resources (with lower score S) may also not cause harmful interference.

Furthermore, if multiple closely located D2D devices transmit using the same resource, collisions may occur. Transmission collision may be resolved using a collision resolution algorithm. For discussion purposes, the admissible resources for the first D2D device may be labeled as $B_1, B_2, \ldots, B_r$ with scores $S_1, S_2, \ldots, S_r$. Another approach is for the first D2D device to generate a random variable X that attains value i=1, 2, . . . , r with probability density function $p(i)=f(S_i)/\Sigma_{j=1,\ldots,r}f(S_j)$, where f(.) is a pre-selected positive non-decreasing function. Then the first D2D device may choose a resource $B_i$, i=1, 2, . . . , r with probability p(i) (e.g., based on random outcomes of X). The function f(.) may be chosen to provide scenarios where all the admissible resources are equally likely (i.e., f(x)=1 for all x), or scenarios that favor admissible resources with higher scores (e.g., $f(x)=\exp(\lambda x)$ for some $\lambda>0$). This allows for nearby D2D devices to potentially use different available resources and reduces potential collisions.

As another illustrative example, for uplink resources, D2D transmission may potentially interfere with the transmissions of UEs that are geographically far away but are still within the coverage area of an eNB or of a neighboring eNB. The definition of nearby may be adjusted for uplink resources. For the first D2D device, nearby eNBs may include an eNB S with a coverage area that actually includes the first D2D device, as well as eNBs whose uplink transmissions may cause interference to eNB S. As in the downlink scenario, the cellular communications system may provide geo-location information of eNBs and uplink UEs, as well as resources assigned to the uplink UEs.

For each resource RB and each nearby UE assigned to use resource RB, the first D2D device may estimate a received power $P_U$ at eNB(U), the eNB that receives the uplink transmission from UE U with an assumption that UE U is transmitting at its maximum transmit power level. The first D2D device may also estimate an aggregate received power $P_O$ of other nearby UE (which may be located in the same or neighboring eNBs) transmitting on the same resource RB at eNB(U), again, assuming that the nearby UE are transmitting at their maximum transmit power levels. The first D2D device may determine a maximum power $P_m(D2D, U)$ that it can transmit with a condition that the transmission by the first D2D device arrives at eNB(U) with a received lower than $P_O/T$, where T is a predetermine threshold. The threshold T may be specified by an operator of the cellular communications system or determined by the cellular communications system by measurements, for example. The resource RB may be an admissible resource for UE U if $P_m(D2D, U)$ is greater than or equal to $P_{min}(D2D)$ where $P_{min}(D2D)$ is the minimum required transmission power level for the first D2D device.

The resource RB is admissible for the first D2D device if it is admissible for all nearby UE U assigned to use resource RB. Let $P_B(D2D)=\min_U(P_m(D2D, U))$, where the minimum is measured over all such UE U. Clearly, $P_B(D2D)$ is the maximum power that the first D2D device can transmit without causing harmful interference. Also, $P_B(D2D)$ is greater than or equal to $P_{min}(D2D)$. As with the downlink scenario, the first D2D device may generate a score S for each admissible resource RB in a manner such that the admissible resources that produce less interference from D2D transmissions of the first D2D device are given a higher score. An example technique for setting the score S is to use the value of $P_B(D2D)$ and assigning higher scores to resources RB for higher values of $P_B(D2D)$. Other possible functions may also be used.

The selection of the resource may be performed based on the score S of the admissible resources, for example. The first D2D device may transmit in the resource RB with the highest score S, for instance. The selection of an admissible resource may also be performed in a probabilistic manner, as in the downlink scenario. Without loss of generality, assume that the admissible resources for the first D2D device are labeled $B_1, B_2, \ldots, B_r$ with scores $S_1, S_2, \ldots, S_r$. Then first D2D device may generate a random variable X that attains value $i=1, 2, \ldots, r$ with probability density function $p(i)=f(S_i)/\Sigma_{j=1,\ldots,r}f(S_j)$, where f(.) is a pre-selected positive non-decreasing function. The first D2D device may choose resource $B_i$, $i=1, 2, \ldots, r$ with probability p(i) (e.g., based on random outcomes of X). Again, selecting different functions f(.) can provide different weights to different resources.

The first D2D device may set the transmission power level of its transmission (block 309). According to an example embodiment, in a situation wherein the first D2D device is using uplink resources, the first D2D device may listen to the broadcast channel of the cellular communications system to determine an interference limit for D2D communications. The first D2D device may set its transmission power level to a lower power level than the interference limit. The interference limit may be specified considering how many D2D devices are in the cellular communications system.

The first D2D device may perform a check to determine if it has received a reduction warning from the cellular communications system (block 311). The reduction warning may be an indication transmitted by the cellular communications system when the cellular communications system has determined that interference from D2D transmissions has exceed a specified limit. The cellular communications system may generate the reduction warning by monitoring interference levels and by using techniques such as hybrid automatic repeat requested (HARD), and the like. The reduction warning may cause the first D2D device to reduce their transmission power levels to reduce interference caused by their transmissions. The specified limit may be defined by a technical standard, or by an operator of the cellular communications system. The specified limit may also be set in accordance with a metric, such as error rate of an eNB or a UE, an interference measured at an eNB or a UE, and the like. If the first D2D device has received the reduction warning, the first D2D device may adjust it's transmit power level to a lower value to reduce interference to the cellular communications system (block 313).

In accordance with an example embodiment, the reduction warning received by the first D2D device may be generated in accordance with interference levels seen at multiple eNBs, such as neighboring eNBs. Each of the neighboring eNBs may observe their own interference levels and generate the reduction warning if the interference level meets a threshold. The eNBs may coordinate to share their reduction warnings. The serving eNB may combine the reduction warnings and provide the combined reduction warning to the first D2D device. As an example, if any one of the neighboring eNBs has generated a reduction warning, the serving eNB may generate the combined reduction warning. As another example, if a specified percentage of neighboring eNBs generated reduction warnings, the serving eNB may generate the combined reduction warning. The specified percentage may be a value specified by an operator of the cellular communications system or it may be dynamically updated on performance data of the cellular communications system. The interference level used to generate the reduction warning may be a multiple value threshold. As an example, if there is a small number of neighboring eNBs, the interference level may be high. The interference level may decrease as the number of neighboring eNBs increases. The reduction warning and/or combined reduction warnings may be provided to the D2D devices by a single eNB (e.g., its serving eNB) or by each individual eNB. The first D2D device may also combine the reduction warnings from individual eNBs on its own.

If the first D2D device has not received a reduction warning or after the first D2D device has adjusted its transmission power level, the first D2D device may perform a check to determine if it is ok to transmit (block 315). The ok to transmit may be another technique that the cellular communications system can use to reduce interference caused by D2D communications. As an illustrative example, the ok to transmit may be implemented as a transmission probability provided by the cellular communications system. The transmission probability may be generated by the cellular communications system to probabilistically control the number of D2D devices transmitting. In other words, the transmission probability may be used to set an acceptable interference level in the cellular communications system. The first D2D device may then generate a random value ranging from 0 to 1 and compare the random value to the transmission probability. If the random value is less than or equal to the transmission probability, the first D2D device is ok to transmit, while if the random value is greater than the transmission probability, the first D2D device is not ok to transmit. It is noted that the discussion of the transmission probability, the generation of a random value, and the comparison of the random value to the transmission probability is one example implementation of ok to transmit and that other implementations are possible. If the first D2D device is ok to transmit, the first D2D device transmits to the second D2D device (block 317). If the first D2D device is not ok to transmit, operations 300 may terminate.

According to an example embodiment, the transmission probability may be determined in accordance with transmission probabilities provided by multiple eNBs, such as neighboring eNBs. The neighboring eNBs may determine its own transmission probability based on an interference that it observes. Since the neighboring eNBs may observe different interference levels, the transmission probabilities from the neighboring eNBs may differ. The neighboring eNBs may coordinate and share the transmission probabilities and the serving eNB of the first D2D device may generate an aggregate transmission probability. As an example, the aggregated transmission probability may be the smallest (or largest) of the shared transmission probabilities. As another example, the aggregated transmission probability may be smaller (or larger) than the smallest (or largest) of the shared transmission probabilities. The serving eNB may provide the aggregated transmission probability to the first D2D device.

According to an example embodiment, uplink resources, downlink resources, or both uplink and downlink resources may be used for D2D communications. As an example, uplink and/or downlink resources may be used depending on a location of the first D2D device, with uplink resources being used for D2D devices located near the edge of a coverage area of an eNB and downlink resources being used for D2D devices located near the eNB itself.

FIG. 3*b* illustrates a flow diagram of second example operations 320 occurring in a first D2D device as the first D2D device communicates with a second D2D device using geo-location information and control channel information provided by a cellular communications system. Operations 320 may be indicative of operations occurring in a first D2D device, such as D2D devices 217, 220, 245, 248, 275, and 290, as it communicates with a second D2D device using geo-location information and control channel information provided by a cellular communications system.

Operations 320 may begin with the first D2D device receiving geo-location information from the cellular communications system (block 325). The geo-location information may include location information of cellular users (i.e., UEs) in the communications system to whom an eNB is currently, intends to transmit to at a given time, intends to give a resource allocation to at a given time, and the like. The geo-location may also include information about resources allocated to cellular users. The first D2D device may receive the geo-location information in a broadcast message or a multicast message from the cellular communications system.

The first D2D device may also decode a control channel to determine transmission information about active transmissions, intended transmissions, and the like (block 327). The cellular communications channel may use a control channel to transmit indications of resource allocations to UEs. The decoding of the control channel by the first D2D device may allow the first D2D device to determine the resources that are being used or are about to be used in cellular transmissions to eNBs or by eNBs. As an illustrative example, the decoding of the control channel may provide the first D2D device with information about resources that are allocated for use by UEs in immediately following time slots of a frame.

According to an example embodiment, the control channel may be divided into multiple portions with each portion corresponding to a geographic region. The first D2D device may only need to decode the portion of the control channel corresponding to a geographical region in which it is located. According to an alternative example embodiment, there may be multiple control channels with each control channel corresponding to a geographic region. The first D2D device may only need to decode the control channel corresponding to a geographical region in which it is located.

According to an example embodiment, the first D2D device may decode multiple control channels from multiple eNBs, e.g., neighboring eNBs. Decoding multiple control channels from multiple eNBs may provide the first D2D device with a clearer picture of resource utilization of resources that are near it. As an example, the first D2D device may be operating near an edge of its serving eNB's coverage area, so UEs served by neighboring eNBs may also be close to the first D2D device. Unless the first D2D device decodes the control channel of its neighboring eNBs, it may not be able to determine the resource usage of otherwise closely located UEs. The serving eNB and the neighboring eNBs may coordinate to share information.

According to an example embodiment, the first D2D device may receive information about which control channel or which part of a control channel to decode. The information may be received from the serving eNB of the first D2D device. The information may help the first D2D device simplify its decoding of the control channel(s). The information may include which resource(s) will be used to convey the control channel(s), as well as any codes or sequences used in conjunction with the control channel(s), which may prevent the first D2D device from having to perform blind detection to find and decode the control channel(s). Information about the control channel(s) may be provided to the D2D devices by a single eNB (e.g., its serving eNB) or by each individual eNB.

The first D2D device may select a resource of the cellular communications system available for use in accordance with the geo-location information and the transmission information (block 329). As an example, the first D2D device may select a resource of the cellular communications system that is not being used in an active transmission, an intended transmission, and the like, within a certain distance of the first D2D device (and of the second D2D device). The certain distance may be specified by an operator of the cellular communications system, or it may be set in accordance with a performance metric. The performance metric may be an interference measured at an eNB or a UE, an error rate of an eNB or a UE, and the like.

The first D2D device may set the transmission power level of its transmission (block 331). The first D2D device may listen to a broadcast channel of the cellular communications system to determine an interference limit for D2D communications. The first D2D device may set its transmission power level to a lower power level than the interference limit.

The first D2D device may perform a check to determine if it has received a reduction warning from the cellular communications system (block 333). The reduction warning may be an indication transmitted by the cellular communications system when the cellular communications system has determined that interference from D2D transmissions has exceed a specified limit. The cellular communications system may generate the reduction warning by monitoring interference levels and by using techniques such as HARQ, and the like. The reduction warning may cause the first D2D device to reduce their transmission power levels to reduce interference caused by their transmissions. The specified limit may be defined by a technical standard, or by an operator of the cellular communications system. The specified limit may also be set in accordance with a metric, such as error rate of an eNB or a UE, an interference measured at an eNB or a UE, and the like. If the first D2D device has received the reduction warning, the first D2D device may adjust it's transmit power level to a lower value to reduce interference to the cellular communications system (block 335).

If the first D2D device has not received a reduction warning or after the first D2D device has adjusted its transmission power level, the first D2D device may perform a check to determine if it is ok to transmit (block 337). If the first D2D device is ok to transmit, the first D2D device transmits to the second D2D device (block 339). If the first D2D device is not ok to transmit, operations 320 may terminate.

Figure 3C:
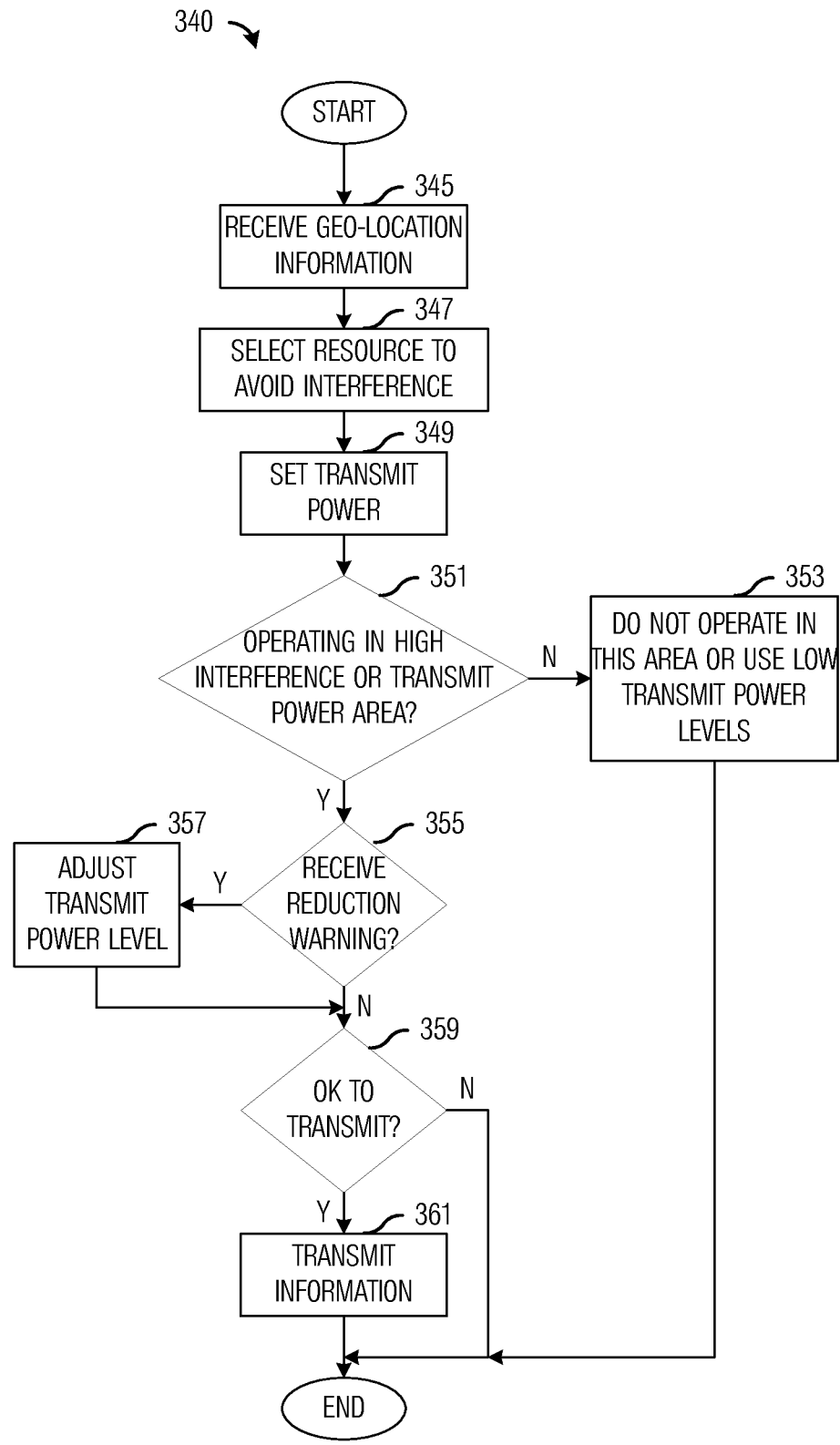
FIG. 3c illustrates a flow diagram of third example operations occurring in a first D2D device as the first D2D device communicates with a second D2D device using geo-location information and transmit power level information provided by a cellular communications system according to example embodiments described herein.

FIG. 3c illustrates a flow diagram of third example operations 340 occurring in a first D2D device as the first D2D device communicates with a second D2D device using geo-location information and transmit power level information provided by a cellular communications system. Operations 340 may be indicative of operations occurring in a first D2D device, such as D2D devices 217, 220, 245, 248, 275, and 290, as it communicates with a second D2D device using geo-location information and transmit power level information provided by a cellular communications system.

Operations 340 may begin with the first D2D device receiving geo-location information from the cellular communications system (block 345). The geo-location information may include location information of cellular users (i.e., UEs) in the communications system to whom an eNB is currently, intends to transmit to at a given time, intends to give a resource allocation to at a given time, and the like. The geo-location may also include information about resources allocated to cellular users. The first D2D device may receive the geo-location information in a broadcast message or a multicast message from the cellular communications system.

The first D2D device may select a resource of the cellular communications system available for use in accordance with the geo-location information (block 347). As an example, the first D2D device may select a resource of the cellular communications system that is not being used within a certain distance of the first D2D device (and of the second D2D device). The certain distance may be specified by an operator of the cellular communications system, or it may be set in accordance with a performance metric. The performance metric may be an interference measured at an eNB or a UE, an error rate of an eNB or a UE, and the like.

The first D2D device may set the transmission power level of its transmission (block 349). The first D2D device may listen to a broadcast channel of the cellular communications system, such as broadcast channels related to uplink transmissions, to determine an interference limit for D2D communications, for example. The first D2D device may set its transmission power level to a lower power level than the interference limit.

The first D2D device may perform a check to determine if it is operating in a high (or low) interference area when using uplink resources for transmission or a high or low transmit power level area when using downlink resources for transmission (block 351). The cellular communications system may transmit an indication of the interference level or the power level of its transmissions. The first D2D device may receive multiple interference levels and/or transmit power levels from multiple eNBs or from a single eNB (e.g., its serving eNB). As an example, in the uplink, for certain resources, only a low interference to neighboring cells may be allowed by the cellular system for UEs so that the neighboring cells can use those resources for their own cell edge UEs. D2D devices may also make use of these resources to transmit along with the UEs since interference limit is generally high and therefore, the impact from the D2D devices is low. When the allowed interference to a resource is small, the D2D devices may not be able to use those resources or need to use them with a lower transmit power (block 353).

For the downlink, similar techniques, such as FFR, exist in cellular systems where in some frequency bands a low transmit power level is used and for some other frequency bands a high power level is used. Transmission in a high power frequency band may not be suitable for D2D communications close to the eNB due to high interference from UEs. Therefore, that frequency band may be better suited for the cell edge UEs. But transmissions may be limited to the resources used in that region to avoid the interference to the UEs. For a low power frequency band, even close D2D communications could occur since regional separation is present to isolate UEs from D2D interference.

If the first D2D device is operating in a high interference area or a high transmit power level area, the first D2D device may perform a check to determine if it has received a reduction warning from the cellular communications system (block 355). The reduction warning may be an indication transmitted by the cellular communications system when the cellular communications system has determined that interference from D2D transmissions has exceed a specified limit. The reduction warning may cause the first D2D device to reduce their transmission power levels to reduce interference caused by their transmissions. The specified limit may be defined by a technical standard, or by an operator of the cellular communications system. The specified limit may also be set in accordance with a metric, such as error rate of an eNB or a UE, an interference measured at an eNB or a UE, and the like. If the first D2D device has received the reduction warning, the first D2D device may adjust it's transmit power level to a lower value to reduce interference to the cellular communications system (block 357).

If the first D2D device has not received a reduction warning or after the first D2D device has adjusted its transmission power level, the first D2D device may perform a check to determine if it is ok to transmit (block 359). If the first D2D device is ok to transmit, the first D2D device transmits to the second D2D device (block 361). If the first D2D device is not ok to transmit, operations 340 may terminate.

According to an example embodiment, D2D devices may be configured to use a transmission system with a portion (such as a half) of the time as that of the frame time of the cellular communications system. Therefore, even if the cellular communications system changes the resource usage every frame, the D2D devices could still use the portion of the frame time for their own D2D communication after determining that resources are not used in a particular geographical area.

Figure 4:
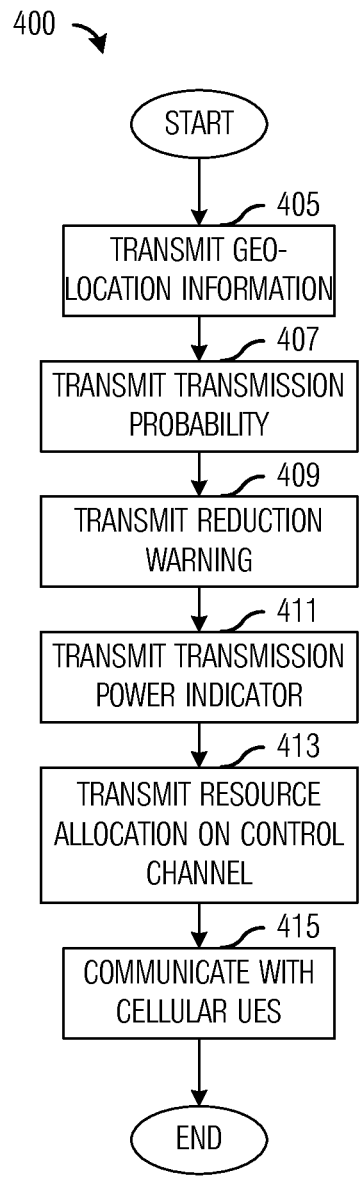
FIG. 4 illustrates a flow diagram of example operations occurring in an entity of a cellular communications system with support for D2D communications according to example embodiments described herein.

FIG. 4 illustrates a flow diagram of example operations 400 occurring in an entity of a cellular communications system with support for D2D communications. Operations 400 may be indicative of operations occurring in an entity, such as eNB 205, eNB 235, eNB 265, and eNB 285, of the cellular communications system as the cellular communications system supports D2D communications.

Operations 400 may begin with the entity transmitting geo-location information (block 405). The geo-location information may include location information of cellular users (i.e., UEs) in the communications system to whom an eNB is currently, intends to transmit to at a given time, intends to give a resource allocation to at a given time, and the like. The geo-location may also include information about resources allocated to cellular users.

The entity may transmit a transmission probability (block 407). The transmission probability may be a numerical value that is used to control the number of D2D devices making transmissions, thereby controlling the interference seen by the cellular communications system. As an example, the transmission probability may be a value ranging from 0 to 1, with a smaller transmission probability implying a smaller number of D2D devices making transmissions.

The entity may transmit a reduction warning (block 409). The reduction warning may be an indicator that the interference seen by the cellular communications system has exceeded a specified limit. The reduction warning may be an indicator that informs the D2D devices to reduce the transmit power levels to reduce the interference.

The entity may transmit a transmission power indicator (block 411). The transmission power indicator may be an indicator of transmission power levels of eNBs in the cellular communications system. The transmission power indicator may indicate the transmission power levels for some or all of the eNBs in the cellular communications system. The transmission power level may indicate to the D2D devices, depending on their location, if they can make a D2D transmission.

The entity may transmit information about resource allocations on a control channel (block 413). The control channel may be used to signal information about pending active resource allocations to UEs. Active resource allocations may include current and/or future resource assignments. The control channel may be decoded by a D2D device to determine resource usage and help the D2D device select a resource to use in a D2D transmission without causing much (or any) interference to the cellular communications system. The entity may communicate with UEs using the resource allocations.

Figure 5:
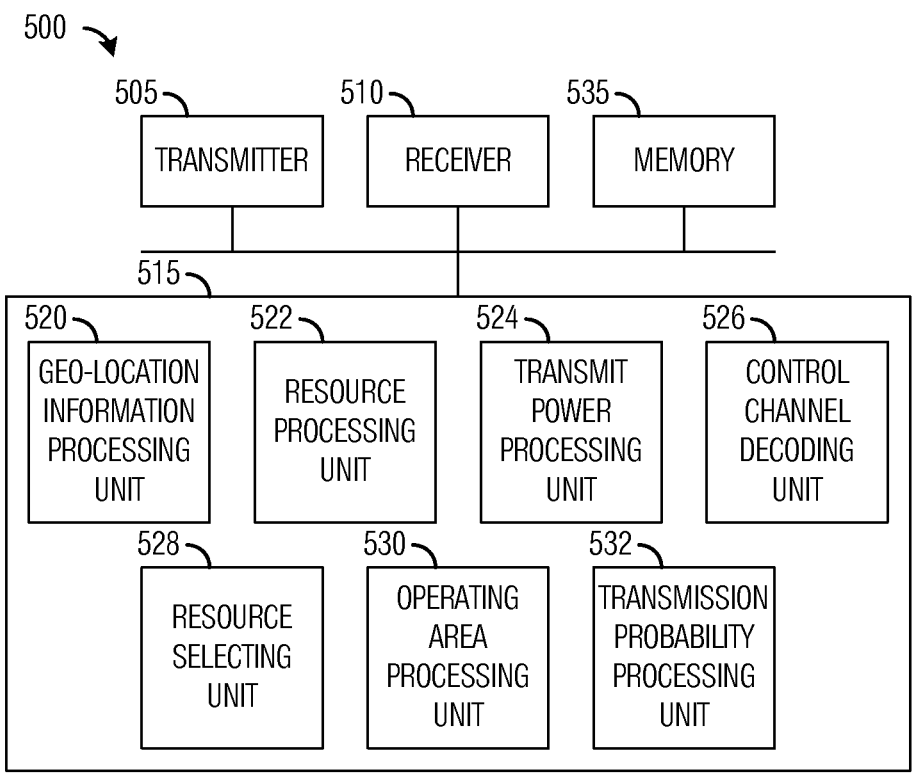
FIG. 5 illustrates an example first communications device according to example embodiments described herein.

FIG. 5 illustrates an example first communications device 500. Communications device 500 may be an implementation of a D2D device, and the like. Communications device 500 may be used to implement various ones of the embodiments discussed herein. As shown in FIG. 5, a transmitter 505 is configured to transmit packets, and the like. Communications device 500 also includes a receiver 510 that is configured to receive packets, geo-location information, transmission probabilities, reduction warnings, transmit power levels, and the like.

A geo-location information processing unit 520 is configured to process geo-location information received from a cellular communications system. Geo-location information processing unit 520 is configured to derive a location of communications device 500 from geo-location information. A resource processing unit 522 is configured to determine admissible resources in accordance with geo-location information. Resource processing unit 522 is configured to determine admissible resources in accordance with transmit power levels of communications device 500. A transmit power processing unit 524 is configured to set a transmit power level of communications device 500 in accordance with interference generated by transmissions made by communications device 500. Transmit power processing unit 524 is configured to reduce the transmit power of communications device 500 if a reduction warning is received. A control channel decoding unit 526 is configured to decode a control channel or a portion of a control channel to determine active resource allocations. Active resource allocations may include current and/or future resource assignments.

A resource selecting unit 528 is configured to select an admissible resource in accordance with geo-location information, transmit power levels, measured interference, estimated interference, scores, and the like. An operating area processing unit 530 is configured to determine an interference level and/or transmit power level of an operating area of communications device 500 to determine if communications device 500 is able to transmit. If the interference level and/or a transmit power level of an operating area is low, communications device 500 may be prevented from transmitting. A transmission probability processing unit 532 is configured to probabilistically regulate the transmissions of communications device 500 help prevent causing undue interference to cellular communications system. A memory 535 is configured to store geo-location information, resource information, admissible resource information, transmit power levels, control channels, control channel information, measured interference, estimated interference, scores, cellular communications system transmission power levels, transmission probabilities, and the like.

The elements of communications device 500 may be implemented as specific hardware logic blocks. In an alternative, the elements of communications device 500 may be implemented as software executing in a processor, controller, application specific integrated circuit, or so on. In yet another alternative, the elements of communications device 500 may be implemented as a combination of software and/or hardware.

As an example, receiver 510 and transmitter 505 may be implemented as a specific hardware block, while geo-location information processing unit 520, resource processing unit 522, transmit power processing unit 524, control channel decoding unit 526, resource selecting unit 528, operating area processing unit 530, and transmission probability processing unit 532 may be software modules executing in a microprocessor (such as processor 515) or a custom circuit or a custom compiled logic array of a field programmable logic array. Geo-location information processing unit 520, resource processing unit 522, transmit power processing unit 524, control channel decoding unit 526, resource selecting unit 528, operating area processing unit 530, and transmission probability processing unit 532 may be modules stored in memory 535.

Figure 6:
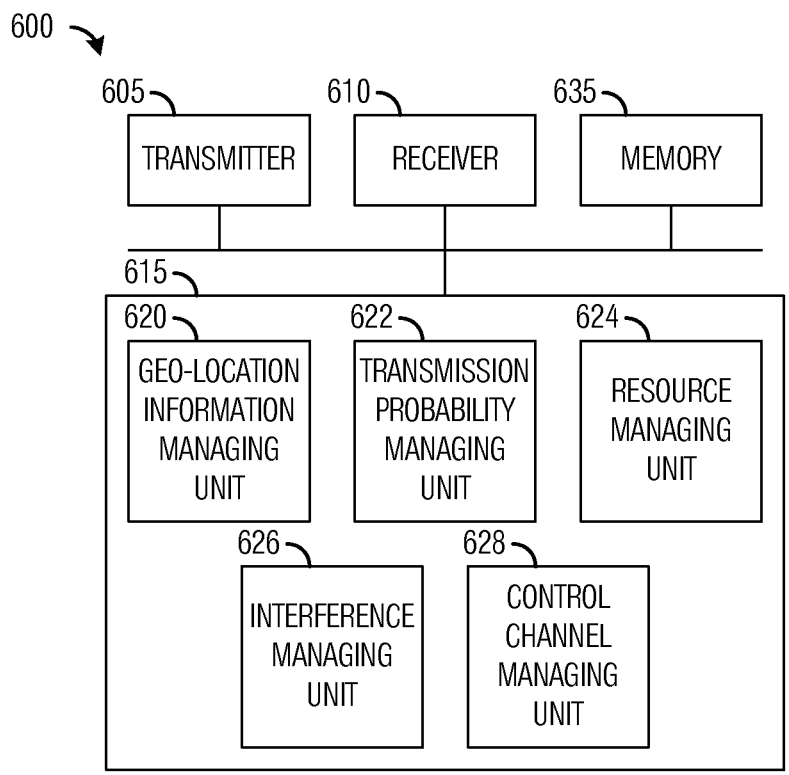
FIG. 6 illustrates an example second communications device according to example embodiments described herein.

FIG. 6 illustrates an example second communications device 600. Communications device 600 may be an implementation of an eNB, a controller, a base station, a NodeB, and the like. Communications device 600 may be used to implement various ones of the embodiments discussed herein. As shown in FIG. 6, a transmitter 605 is configured to transmit packets, geo-location information, transmission probabilities, reduction warnings, transmit power levels, and the like. Communications device 600 also includes a receiver 610 that is configured to receive packets, and the like.

A geo-location information managing unit 620 is configured to manage and/or provide geo-location information for a cellular communications system. A transmission probability managing unit 622 is configured to generate a probability for use in probabilistically controlling transmissions of D2D devices to regulate the interference to the cellular communications system arising from D2D transmissions. A resource managing unit 624 is configured to manage resources assignments. Resource managing unit 624 is configured to assign resources to UEs. Resource managing unit 624 is configured to assign resource usage for different geographical areas. An interference managing unit 626 is configured to determine interference caused to communications device 600 and to reduce interference from D2D communications if the interference exceeds a specified threshold. Interference managing unit 626 generates a reduction warning to throttle transmit power levels of D2D transmissions and reduce interference to communications device 600. A control channel managing unit 628 is configured to generate control channels for active resource assignments (i.e., active resource allocations) to UEs. Control channel managing unit 628 is configured to generate multiple control channels for multiple geographical areas or a single control channel with multiple portions for multiple geographical areas. A memory 635 is configured to store geo-location information, resource information, admissible resource information, transmit power levels, control channels, control channel information, measured interference, estimated interference, cellular communications system transmission power levels, transmission probabilities, and the like.

The elements of communications device 600 may be implemented as specific hardware logic blocks. In an alternative, the elements of communications device 600 may be implemented as software executing in a processor, controller, application specific integrated circuit, or so on. In yet another alternative, the elements of communications device 600 may be implemented as a combination of software and/or hardware.

As an example, receiver 610 and transmitter 605 may be implemented as a specific hardware block, while geo-location information managing unit 620, transmission probability managing unit 622, resource managing unit 624, interference managing unit 626, and control channel managing unit 628 may be software modules executing in a microprocessor (such as processor 615) or a custom circuit or a custom compiled logic array of a field programmable logic array. Geo-location information managing unit 620, transmission probability managing unit 622, resource managing unit 624, interference managing unit 626, and control channel managing unit 628 may be modules stored in memory 635.

Although the present disclosure and its advantages have been described in detail, it should be understood that various changes, substitutions and alterations can be made herein without departing from the spirit and scope of the disclosure as defined by the appended claims.

What is claimed is:

1. A method for operating a first device-to-device (D2D) user device in a cellular communications system, the method comprising:
   receiving, by the first D2D user device, information from a first controller entity in the cellular communications system, the received information including geo-location information for cellular user equipments (UEs) and resource information for resources of the cellular communications system available to the cellular UEs, the received information including information specifying a geographical area, the received information further including information about transmit power level of evolved NodeBs when D2D user devices are in the geographical area specified in the received information from the first controller entity, or information about maximum transmit power level allowed for the D2D user devices when in the geographical area specified in the received information from the first controller entity, the geographical area being one of a plurality of geographical areas associated with the first controller entity;
   after the receiving, estimating, by the first D2D user device, interference to a cellular transmission in accordance with the received information;
   selecting, by the first D2D user device, one of the resources for a D2D communication to avoid causing the interference to the cellular transmission, the resource being selected in accordance with the received information and the estimated interference to the cellular transmission, the received information indicating whether the first D2D user device is located near an edge of a coverage area of the first controller entity or near a center of the coverage area of the first controller entity, the first D2D user device selecting a resource allocated for uplink communication from a first cellular UE to the first controller entity as the selected one of the resources for the D2D communication in response to the first D2D user device being located near the edge of the coverage area, or the first D2D user device selecting a resource allocated for downlink communication from the first controller entity to a second cellular UE as the selected one of the resources for the D2D communication in response to the first D2D user device being located near the center of the coverage area; and
   transmitting, by the first D2D user device, to a second D2D user device over the selected one of the resources for the D2D communication in accordance with a D2D transmit power level with interference to the cellular transmission lower than interference to the cellular transmission from communications by the evolved NodeBs or other receiving nodes using the selected one of the resources.

2. The method of claim 1, wherein the received information further comprises at least one of resource partitioning information based on the geographical area, or resource partitioning information based on path loss information from the cellular UEs to an evolved NodeB.

3. The method of claim 1, wherein the transmitting to the second D2D user device occurs if a first transmit power level of an evolved NodeB for a first geographical area containing the first D2D user device and the second D2D user device is high.

4. The method of claim 3, wherein the information about transmit power level comprises transmit power levels of the evolved NodeBs for a subset of the resources of the cellular communications system.

5. The method of claim 1, further comprising retrieving active resource usage information from a database, and wherein the one of the resources is selected in accordance with the active resource usage information.

6. The method of claim 1, further comprising decoding a first control channel broadcast by a second entity in the cellular communications system to derive active resource usage information, and wherein the one of the resources is selected in accordance with the active resource usage information.

7. The method of claim 6, further comprising decoding a plurality of control channels including the first control channel, the plurality of control channels transmitted by a plurality of entities in the cellular communications system.

8. The method of claim 6, wherein there are a plurality of control channels including the first control channel, and wherein the first control channel is associated with a second geographical area containing the first D2D user device and the second D2D user device.

9. The method of claim 1, further comprising:
   receiving a transmission probability broadcast by a third entity in the cellular communications system; and
   generating a random value, and wherein the transmitting occurs if the random value is less than or equal to the transmission probability.

10. The method of claim 1, wherein the transmitting occurs on the resource allocated for uplink controller communication.

11. The method of claim 1, further comprising reducing the D2D transmit power level in response to receiving a power reduction warning from the cellular communications system.

12. The method of claim 1, wherein the received information further comprises resources not used in the geographical area, and wherein the selecting comprises selecting one of the resources not used.

13. The method of claim 1, the plurality of geographical areas associated with the first controller entity comprising more than two geographical areas associated with the first controller entity.

14. The method of claim 1, further comprising:
   after the receiving, estimating, by the first D2D user device, an aggregate interference from the evolved NodeBs to the cellular UEs, wherein the selecting comprises selecting the one of the resources for a D2D communication in accordance with received information, the estimated interference to the cellular transmission, and the estimated aggregate interference from the evolved NodeBs.

15. A method for operating a communications controller of a cellular communications system, the method comprising:

determining, by the communications controller, information for the cellular communications system, the determined information including geo-location information for cellular user equipments (UEs) of the cellular communications system and resource information for resources of the cellular communications system available to the cellular UEs, the determined information including information specifying a geographical area, the determined information further including information about transmit power level of evolved NodeBs when D2D user devices are in the geographical area specified in the determined information, or information about maximum transmit power level allowed for the D2D user devices when in the geographical area specified in the determined information, the geographical area being one of a plurality of geographical areas associated with the communications controller;

transmitting, by the communications controller, the determined information, including the geo-location information for the cellular UEs, to device-to-device (D2D) user devices operating within a coverage area of the cellular communications system, wherein a first D2D user device estimates interference to a cellular transmission in accordance with the transmitted information;

communicating, by the communications controller, with a cellular UE operating within a coverage area of the communications controller in accordance with a resource allocation for the cellular UE;

determining, by the communications controller, a D2D interference level generated by D2D transmissions made by the D2D user devices and seen by the communications controller has exceeded a D2D interference threshold; and transmitting, by the communications controller in response to determining the D2D interference level has exceeded the D2D interference threshold, a power reduction warning to the D2D user devices for the D2D user devices to adjust their transmit power levels to lower values, wherein the communications controller is not a serving evolved NodeB for at least one of the D2D user devices.

16. The method of claim 15, wherein determining the geo-location information comprises generating the geo-location information.

17. The method of claim 15, wherein determining the geo-location information comprises retrieving the geo-location information from a database.

18. The method of claim 15, further comprising:
sharing the power reduction warning with other communications controllers in the cellular communications system.

19. The method of claim 15, further comprising:
generating a transmission probability for probabilistically controlling a number of D2D user devices allowed to transmit; and
transmitting the transmission probability to the D2D user devices.

20. The method of claim 15, wherein the resource allocation is a dynamic resource allocation, and wherein the method further comprises transmitting information about the resource allocation in a control channel.

21. The method of claim 15, wherein the resource allocation is a semi-static resource allocation, and wherein the method further comprises broadcasting information about the resource allocation in a broadcast channel.

22. The method of claim 15, wherein the resource allocation is a static resource allocation, and wherein the method further comprises storing information about the resource allocation in a database.

23. The method of claim 15, wherein determining the geo-location information further comprises coordinating with other communications controllers to determine the geo-location information.

24. A first device-to-device (D2D) user device comprising:
a receiver of the D2D user device configured to:
receive information from a first controller entity in a cellular communications system, the received information including geo-location information for cellular user equipments (UEs) and resource information for resources of the cellular communications system available to the cellular UEs, the received information including information specifying a geographical area, the received information further including information about transmit power level of evolved NodeBs when D2D user devices are in the geographical area specified in the received information from the first controller entity, or information about maximum transmit power level allowed for the D2D user devices when in the geographical area specified in the received information from the first controller entity, the geographical area being one of a plurality of geographical areas associated with the first controller entity;
a processor of the D2D user device operatively coupled to the receiver, the processor configured to:
after receiving the information, estimate interference to a cellular transmission in accordance with the received information; and
select one of the resources for a D2D communication to avoid causing the interference to the cellular transmission, the resource being selected in accordance with the received information and the estimated interference, the received information indicating whether the first D2D user device is located near an edge of a coverage area of the first controller entity or near a center of the coverage area of the first controller entity, the processor selecting a resource allocated for uplink communication from a first cellular UE to the first controller entity as the selected one of the resources for the D2D communication in response to the first D2D user device being located near the edge of the coverage area, or the processor selecting a resource allocated for downlink communication from the first controller entity to a second cellular UE as the selected one of the resources for the D2D communication in response to the first D2D user device being located near the center of the coverage area; and
a transmitter of the D2D user device operatively coupled to the processor, the transmitter configured to:
transmit to a second D2D user device over the selected one of the resources for the D2D communication in accordance with a D2D transmit power level with interference to the cellular transmission lower than interference to the cellular transmission from communications by the evolved NodeBs or other receiving nodes using the selected one of the resources.

25. The first D2D user device of claim 24, wherein the processor is configured to decode a control channel broadcast by a second entity in the cellular communications system to derive active resource usage information, and wherein the one of the resources is selected in accordance with the active resource usage information.

26. The first D2D user device of claim 24, wherein the receiver is configured to receive a transmission probability broadcast by a third entity in the cellular communications system, and the processor is configured to generate a random value, and wherein the transmitter transmits if the random value is less than or equal to the transmission probability.

27. The first D2D user device of claim 24, wherein the transmitter transmits on the resource allocated for uplink controller communication.

28. The first D2D user device of claim 24, wherein the receiver is configured to receive a power reduction warning from the cellular communications system, and wherein the processor is configured to reduce a third transmit power level of the transmitter.

29. The first D2D user device of claim 24, wherein the processor is configured to retrieve active resource usage information from a database, and wherein the one of the resources is selected in accordance with the active resource usage information.

* * * * *